United States Patent
Winsvold

(10) Patent No.: US 7,519,347 B2
(45) Date of Patent: Apr. 14, 2009

(54) METHOD AND DEVICE FOR NOISE DETECTION

(75) Inventor: Bjørn Winsvold, Tranby (NO)

(73) Assignee: Tandberg Telecom AS, Lysaker (NO)

( * ) Notice: Subject to any disclaimer, the term of this patent is extended or adjusted under 35 U.S.C. 154(b) by 491 days.

(21) Appl. No.: 11/407,692

(22) Filed: Apr. 20, 2006

(65) Prior Publication Data

US 2006/0259300 A1 Nov. 16, 2006

(30) Foreign Application Priority Data

Apr. 29, 2005 (NO) .................................. 20052109

(51) Int. Cl.
*H04B 1/10* (2006.01)

(52) U.S. Cl. .................. 455/283; 455/63.1; 455/67.13; 455/570; 704/233; 704/210; 704/226; 704/251; 704/235

(58) Field of Classification Search ................. 455/283, 455/63.1, 67.13, 570; 704/233, 210, 226, 704/251, 235
See application file for complete search history.

(56) References Cited

U.S. PATENT DOCUMENTS

| 5,355,431 | A | * | 10/1994 | Kane et al. .................. 704/226 |
| 6,415,253 | B1 | | 7/2002 | Johnson |
| 7,010,119 | B2 | * | 3/2006 | Marton et al. .......... 379/406.06 |
| 7,120,580 | B2 | * | 10/2006 | Rao Gadde et al. ......... 704/233 |
| 7,155,387 | B2 | * | 12/2006 | Globerson ................... 704/226 |
| 2002/0123308 | A1 | | 9/2002 | Feltstrom |
| 2003/0158732 | A1 | * | 8/2003 | Pi et al. ....................... 704/251 |

FOREIGN PATENT DOCUMENTS

WO     WO 0038180 A1    6/2000

OTHER PUBLICATIONS

Claesson, I., et al., "Cancellation of Humming GSM Mobile Telephone Noise," Information Communications and Signal Processing, Proceedings of the 2003 Joint Conf. of the Fourth Int'l. Conference, vol. 1, Dec. 15-18, 2003.

Bitzer, J., et al., "Detection, Interpolation and Cancellation Algorithms for GSM Burst Removal for Forensic Audio," Conference of the Int'l. Assoc. for Forensic Phonetics (IAFP 2003), paper No. 21, Wien, Austria.

* cited by examiner

*Primary Examiner*—Sanh D Phu
(74) *Attorney, Agent, or Firm*—Oblon, Spivak, McClelland, Maier & Neustadt, P.C.

(57) ABSTRACT

A system and method for detecting cell phone noise induced in telecommunication equipment, especially in microphones and other unshielded electronic units connected to a communication terminal. A noise detector is configured to execute a so-called "cepstrum" transform of a captured signal exposed to cell phone noise. Due to the characteristics of cell phone radio signals using TDMA, cell phone induced can then easily be detected from the cepstrum transform as peaks at known samples, and noise elimination or attenuation may then be executed on the captured signal when cell phone noise is detected.

14 Claims, 5 Drawing Sheets

METHOD AND DEVICE FOR NOISE DETECTION

RELATED APPLICATION

This application claims priority under 35 U.S.C. § 119 or 365 to Norwegian Application No. 20052109, filed Apr. 29, 2005. The entire teachings of the above application are incorporated herein by reference.

BACKGROUND

Conventional conference systems are usually equipped with a sensitive non-directive microphone to capture speech from a plurality of participants. The wide coverage area may compromise with noise protection, as any shield or casing will reduce the audio capturing characteristics. As conference microphones also usually are movable, other electronic components may be exposed to external noise.

In particular, the increased use of Global System for Mobile Communications (GSM) mobile phones has lead to an increasing problem with disturbing noise in video and telephone conferences. This noise is introduced into the conferencing system as a result of interference with the audio capturing components caused by radio transmission from the GSM mobile phones. The acoustic components in a video-conferencing system consist of one or more microphones capturing the near-end audio, one or more loudspeakers presenting the far-end audio and a general signal processing unit (codec). When the GSM mobile phones induce interference noise to the audio system, the noise will be received as a very annoying and disturbing noise at the far-end side and the speech intelligibility will be severely degraded.

The GSM networks make use of the TDMA (Time Division Multiple Access) technique to be able to squeeze more calls onto one channel by dividing a calling channel into a few "discontinuous" pieces. TDMA has 8 time slots (i.e. transmitting for one eighth of the time) and the length of each time slot is 0.57 ms (1/8*1/217). Thus, a GSM mobile phone in transmitting mode emits short duration radio-frequency pulses at a rate of 217 Hz. FIG. 1a shows the TDMA pulses sent out from the GSM phone during a registration message. Since the audio capturing devices (microphones) are AC-coupled to the codec, the TDMA pulse train will be filtered through a band-pass filter and the shape of TDMA pulse train picked up by the microphone is shown in FIG. 1b.

FIG. 5a shows a GSM induced interference signal combined with normal background noise. The time intervals between each negative spike are 4.6 ms (1/(217 Hz)) and the intervals between the negative and the positive spikes are 0.57 ms. The negative spikes are related to the start of the TDMA time slots and the positive spikes are related to the end of the time slots. The induced interference signal contains the 217 Hz fundamental and a large number of harmonics that overlap the frequency range of speech, and therefore severely degrade speech intelligibility.

The GSM mobile phones radio-frequency pulses in a number of situations, some of which are listed below.

When turning on, the terminal transmits a "power on"-registration message to the base station.
When turning off, the terminal transmits a "power off"-registration message to the base station tower.
Occasionally or periodically the terminal transmits a re-registration message to the base station tower.
When sending a Short Message Service (SMS) message.
When receiving an SMS message.
Prior to and during an incoming call.
Prior to and during an outgoing call
When crossing a border between coverage areas managed by different Mobile Switching Centres (MSC).

Hence, a mobile phone emits sharp pulses in a number of situations, and as the mobile phone turns out to be a common property, GSM noise has turned out to be a big problem in conferences.

SUMMARY

The present invention relates to an audio communication method and device for detecting cell phone induced noise in electronic communication equipment.

There is a need for a system and method that minimizes the problems described above.

In particular, the present invention discloses a method for detecting cell phone induced noise of a captured signal in a telecommunication equipment, including the steps of Fourier transforming the captured signal to a Fourier transformed signal, executing a logarithmic function on the Fourier transform signal to a logarithmic Fourier transform signal, Fourier transforming the logarithmic Fourier transform signal to a cepstrum signal, and deciding whether one or more amplitudes associated with one or more samples in the cepstrum signal are above one or more corresponding threshold(s).

A noise detector corresponding to this method is also disclosed.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

In the following, the present invention will be discussed by describing preferred embodiments, and by referring to the accompanying drawings. However, even if the specific embodiments are described in connection with video conferencing and stereo sound, people skilled in the art will realize other applications and modifications within the scope of the invention as defined in the enclosed independent claims.

Figure 1A:
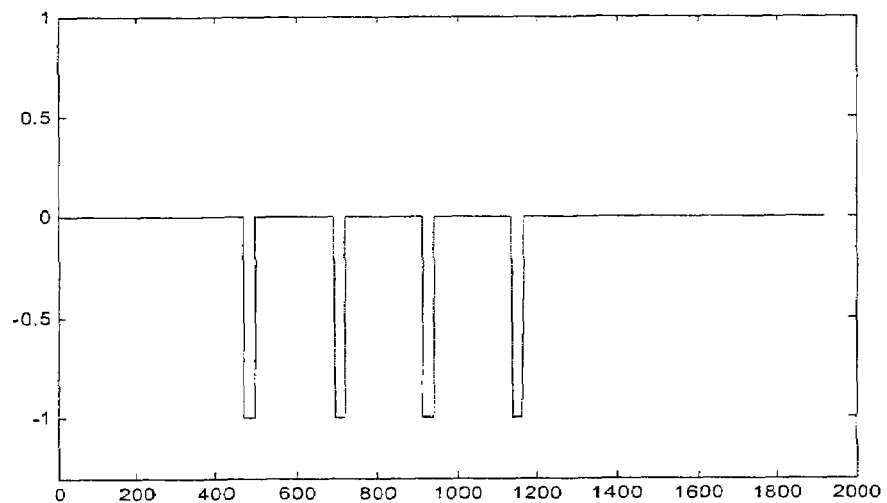
FIG. 1a shows a GSM impulse train of TDMA pulses.
Figure 1B:
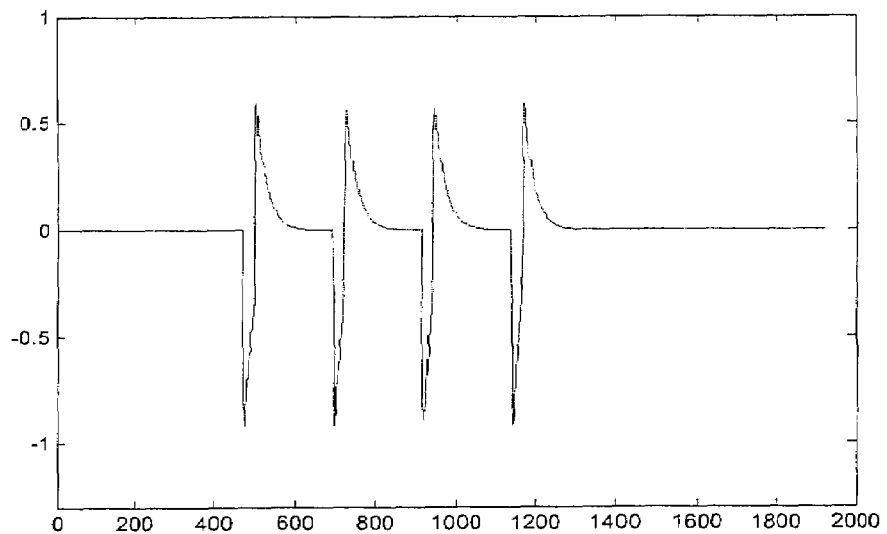
FIG. 1b show the GSM impulse train when AC coupled in an encoder.
Figure 2:
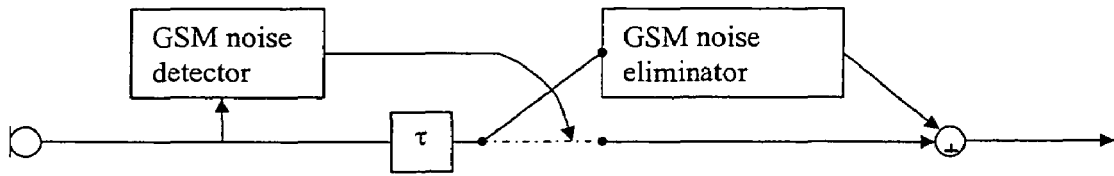
FIG. 2 is an illustration of a GSM noise detector and eliminator.

The present invention discloses a method allowing an audio processing unit to detect the situations mentioned in the background section when the audio is disrupted by the GSM induced noise. When GSM noise is detected by means of the present invention (see FIG. 2), a process in the audio processing unit for reducing or removing this annoying noise is initiated. The noise can be eliminated in various ways, some of which are suggested herein.

According to the present invention, an analyzing technique called cepstrum is utilized to detect GSM induced noise. A cepstrum (pronounced "kepstrum") is the result of taking the Fourier transform of the logarithmic magnitude spectrum of a signal. The cepstrum was for the first time defined in Tukey, J. W., B. P. Bogert and M. J. R. Healy: "The quefrency analysis of time series for echoes: cepstrum, pseudo-autocovariance, cross-cepstrum, and saphe-cracking". Proceedings of the Symposium on Time Series Analysis (M. Rosenblatt, Ed) Chapter 15, 209-243. New York: Wiley.

A simplified definition of cepstrum of a signal is the Fourier Transform (FT) of the logarithm of the FT of the signal. This can mathematically be expressed as follows:

cepstrum of signal=FT(log(FT(the signal)))

and algorithmically:

signal→FT→log→FT→cepstrum

In terms of cepstrum analysis, "FT" is used to indicate the Fourier transform function, rather than "FFT", since the Fast Fourier Transform is not specifically required.

The term "cepstrum" is an anagram of "spectrum", formed by reversing the first four letters. Similar anagrams used in the cepstrum terminology are "quefrency" corresponding to frequency, and "gamnitude", corresponding to magnitude.

As indicated above, the cepstrum is the spectrum of a spectrum, and has certain properties that make it useful in many types of signal analysis. One of its more powerful attributes is the fact that any periodicities, or repeated patterns, in a spectrum will be sensed as one or two specific components in the cepstrum. If a spectrum contains several sets of sidebands or harmonic series, they can be confusing because of overlap, but in the cepstrum, they will be separated in a way similar to the way the spectrum separates repetitive time patterns in the waveform. In simplified terms, an pulse train in a time signal is represented with periodicity in the corresponding Fourier Transform, that again is represented by well-defined peaks in the cepstrum.

Figure 4A:
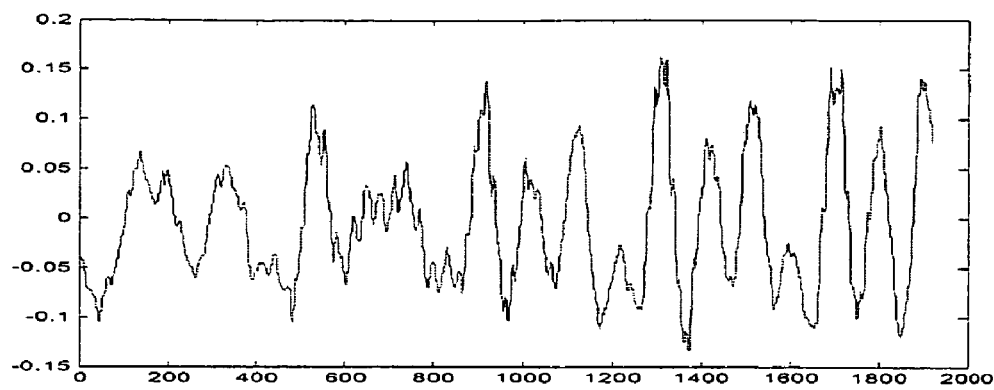
FIGS. 4a, 4b and 4c respectively shows a time-signal, FFT and Cepstrum of a speech signal.
Figure 4B:
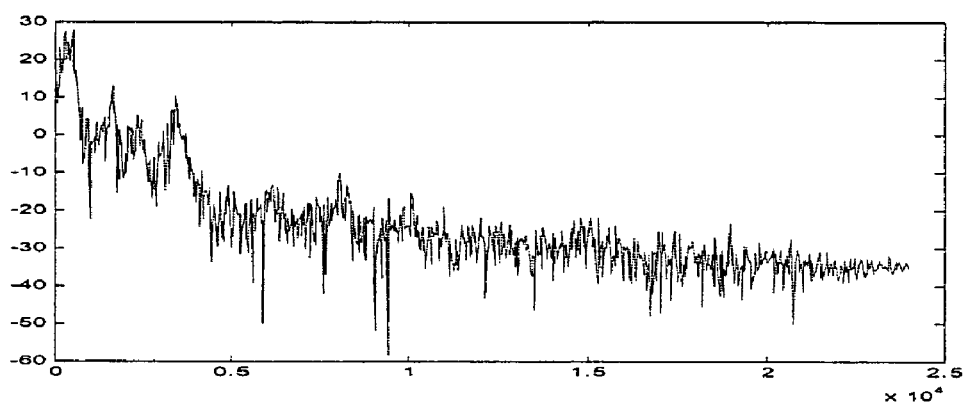
Figure 5A:
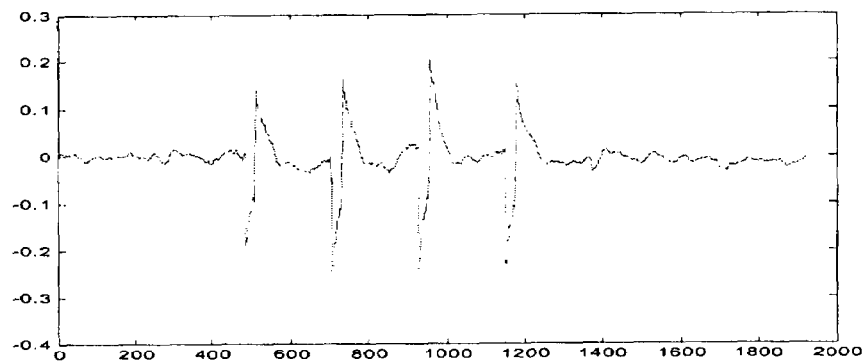
FIGS. 5a, 5b and 5c respectively shows a time-signal, FFT and Cepstrum of a GSM induced background noise signal.
Figure 5B:
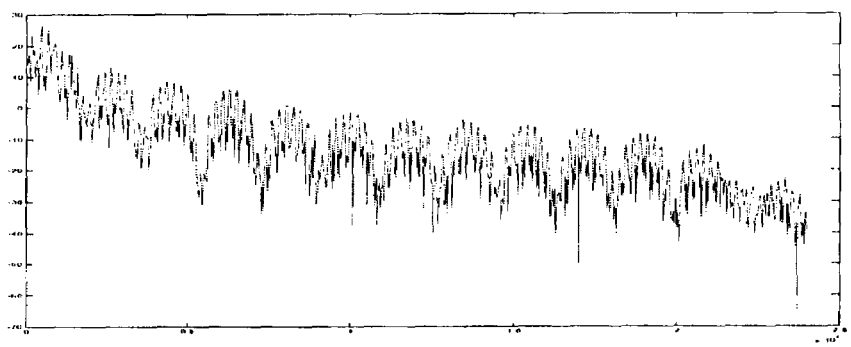
Figure 5C:
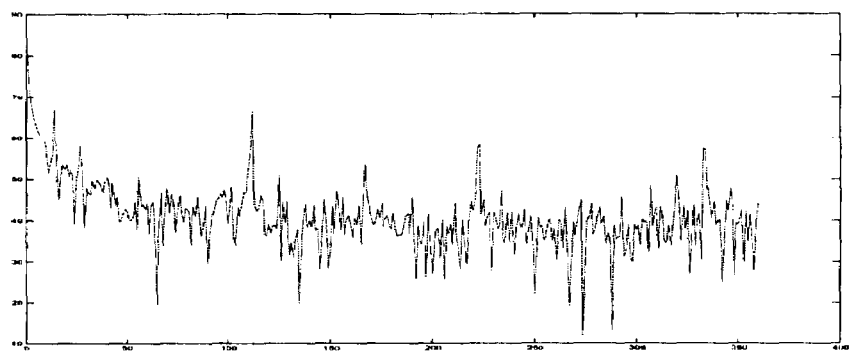
Figure 6A:
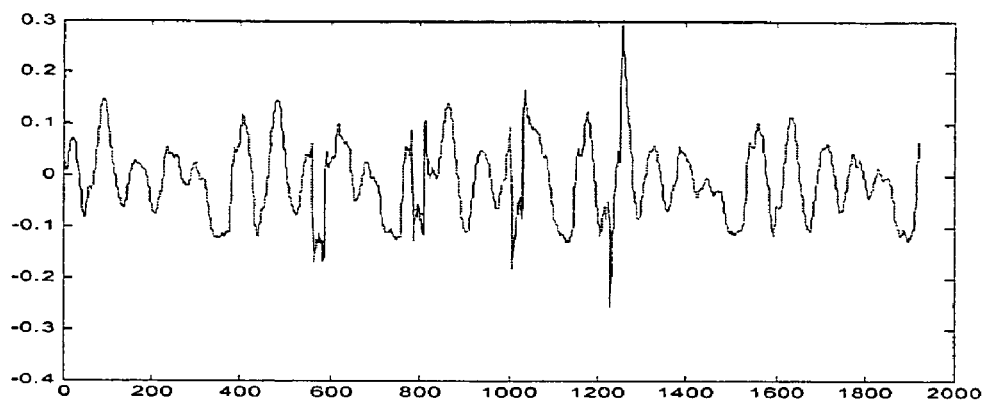
FIGS. 6a, 6b and 6c respectively shows a time-signal, FFT and Cepstrum of a GSM induced speech signal.
Figure 6B:
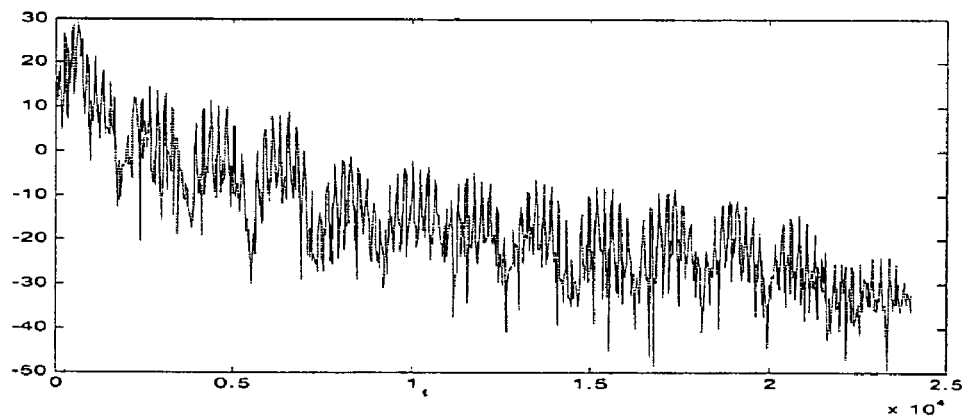
Figure 6C:
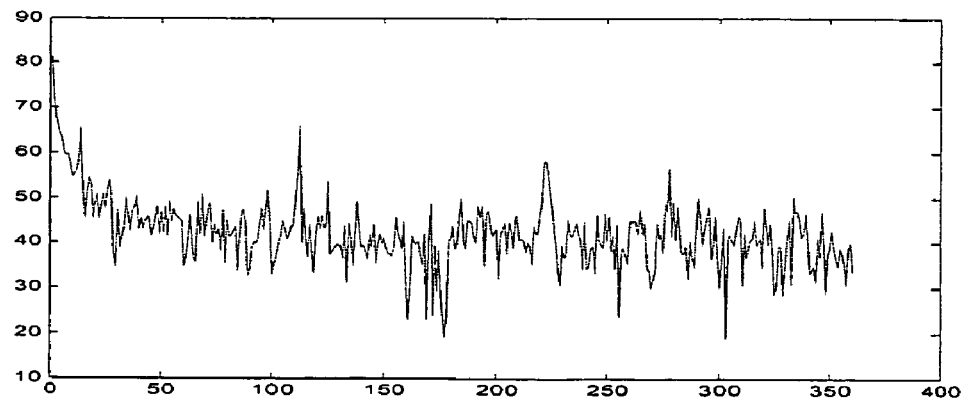

The present invention utilizes the fact that the GSM induced interference signal contains the fundamental and a lot of harmonics of the 217 Hz, which gives a periodic frequency spectrum (see FIGS. 5b and 6b). A frequency spectrum of human voice does not have the same periodicity characteristics (see FIG. 4b). However, when a human voice is mixed with GSM induced noise (see FIG. 6a), the frequency spectrum of the mixed signal will have the characteristic periodicity which will give a distinct peak in the cepstrum, although it is difficult to distinguish the mixed time signal (human voice+GSM noise) (FIG. 6a) from a pure human voice signal (FIG. 4a). Thus, it is appropriate to use cepstrum analysis to distinguish between normal human voice (or background noise) and the GSM induced interference signal, because the different characteristics will uniquely distinguish them in the cepstrum. Note that even if the interference signal is mixed with the human voice signal as shown if FIG. 6a, the frequency spectrum still have the characteristic periodicity (FIG. 5b) even if it is hard to see that the time signal has been disrupted by the GSM noise.

Figure 4C:
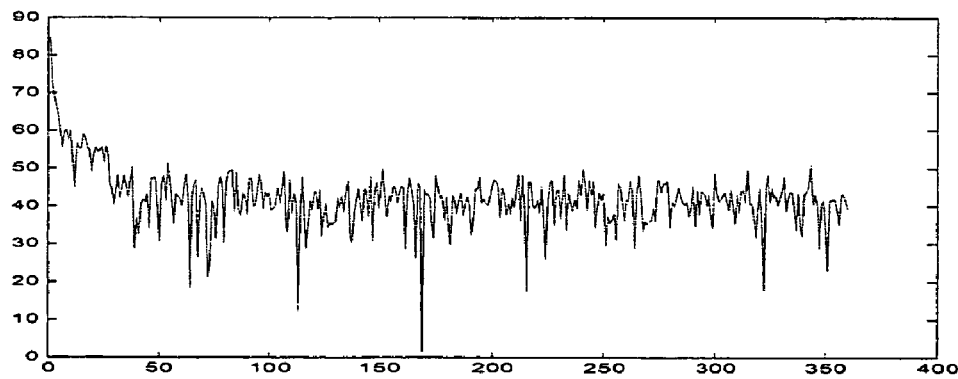

The cepstrum analysis will detect the characteristic periodicity in the frequency spectrum by giving a high "gamnitude" value at the quefrency index given by fs/2*1/217, where fs=sampling frequency. In the FIGS. 4 . . . 6 the sampling frequency is fs=48000 Hz. This gives a quefrency index q=111. By monitoring the "gamnitude" Q of quefrency index 111, the GSM noise detector can switch in the GSM noise eliminator whenever Q(111) is above a certain threshold.

To make the detection even more secure, the GSM noise detector may additionally look at the Q(2*111) and also the neighbor quefrency lines and switch in the eliminator filter if e.g.:

EXAMPLE 1:

$(Q(q)>\text{threshold1})$ AND $(Q(2*q)>\text{threshold2})$

EXAMPLE 2:

$(Q(q)>\text{threshold1})$ AND $(Q(2*q)>\text{threshold2})$ AND $(Q(q\pm n)<\text{threshold1})$, where n=[2 . . . 10].

EXAMPLE 3:

$Q(q)>2*\max(Q(q\pm n))$, where n=[2 . . . 10]

EXAMPLE 4:

$(Q(q)>2*\max(Q(q\pm n)))$ AND $(Q(2*q)>2*\max(Q(2*q\pm n)))$, where n=[2 . . . 10]

In example 1 and 2 the decision is based on absolute thresholds and in example 3 and 4 the decision is based on thresholds relative to the maximum "gamnitudes" of the "quefrencies" not being monitored.

Figure 3:
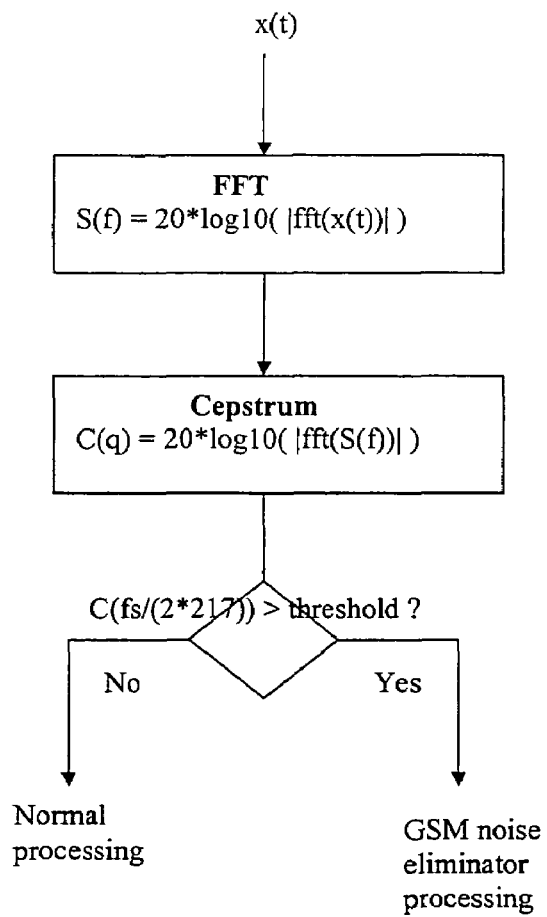
FIG. 3 is flow chart illustrating an example of the present invention.

FIG. 3 shows a block diagram of the GSM noise detector with the simplest form of decision:

if(Q(111)>threshold)

switch in GSM noise eliminator else normal processing

The present invention will make it possible in software to detect situations where the analogue audio system is disrupted by GSM mobile phones.

A noise detector according to the present invention could be installed at the near-end side of a conference before loading the audio signal on the near-end loudspeaker for removing noise originating from near-end equipment, but it could also be installed at the far-end side of a conference before loading the audio signal on the far-end loudspeaker for removing noise originating from near-end equipment. The advantage of the latter is that it allows for GSM noise detection and GSM noise removal even if the noise originates from installations not provided with the GSM noise detector/eliminator.

When noise is detected, several ways of eliminating or attenuating the noise could be initiated. One example is to mute the signal exposed to the noise. Another example is to filter the noise from the signal before transmitting the signal forward. Note that the present invention is not restricted to noise from a GSM phone. The present invention could be used in all other cell phone noise due to TDMA or similar systems.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for detecting cell phone induced noise of a captured signal in a telecommunication equipment, comprising:

Fourier transforming, by a processing unit, the captured signal to a Fourier transformed signal;

executing a logarithmic function on the Fourier transformed signal resulting in a logarithmic Fourier transform signal;

Fourier transforming the logarithmic Fourier transform signal to a cepstrum signal; and detecting cell phone induced noise in the captured signal if one or more amplitudes associated with one or more samples in the cepstrum signal are above one or more corresponding thresholds.

2. A method according to claim 1, wherein if the one or more amplitudes associated with one or more samples in the cepstrum signal are above one or more corresponding thresholds, then eliminating or attenuating the cell phone induced noise from the captured signal.

3. A method according to claim 1, wherein the one or more thresholds is a predefined value.

4. A method according to claim 3, wherein the one or more thresholds is relative to a maximum amplitude of the cepstrum signal not associated with the one or more samples.

5. A method according to claim 2, wherein the eliminating or attenuating further includes muting the captured signal while cell phone induced noise is detected.

6. A method according to claim 2, wherein the eliminating or attenuating further includes filtering the cell phone induced noise from the captured signal while cell phone induced noise is detected.

7. A method according to claim 1, wherein the cell phone induced noise is induced in a microphone or another unshielded electronic module connected to a communication terminal.

8. A noise detector for detecting cell phone induced noise of a captured signal in a telecommunication equipment, comprising:

a processing unit configured to receive the captured signal, Fourier transform the captured signal to generate a Fourier transformed signal, execute a logarithmic function on the Fourier transformed signal to generate a logarithmic Fourier transform signal, Fourier transform the logarithmic Fourier transform signal to generate a cepstrum signal, and detect cell phone induced noise in the captured signal if one or more amplitudes associated with one or more samples in the cepstrum signal are above one or more corresponding thresholds.

9. A noise detector according to claim 8, wherein the processing unit is further configured to eliminate or attenuate the cell phone induced noise from the captured signal if the one or more amplitudes associated with one or more samples in the cepstrum signal are above one or more corresponding threshold.

10. A noise detector according to claim 8, wherein the one or more thresholds are predefined values.

11. A noise detector according to claim 8, wherein the one or more thresholds are relative to a maximum amplitude of the cepstrum signal not associated with the one or more samples.

12. A noise detector according to claim 8, wherein the processing unit is further configured to mute the captured signal while cell phone induced noise is detected.

13. A noise detector according to claim 8, further comprising a filter configured to filter the cell phone induced noise from the captured signal while cell phone induced noise is detected.

14. A noise detector according to claim 8, wherein the cell phone induced noise is induced in a microphone or another unshielded electronic module connected to a communication terminal.

* * * * *